United States Patent
Van Sickle et al.

(10) Patent No.: US 11,657,072 B2
(45) Date of Patent: May 23, 2023

(54) AUTOMATIC FEATURE EXTRACTION FROM IMAGERY

(71) Applicant: HERE Global B.V., Eindhoven (NL)

(72) Inventors: Jan Van Sickle, Boulder, CO (US); Nicholas Dronen, Boulder, CO (US)

(73) Assignee: HERE Global B.V., Eindhoven (NL)

( * ) Notice: Subject to any disclaimer, the term of this patent is extended or adjusted under 35 U.S.C. 154(b) by 891 days.

(21) Appl. No.: 16/413,873

(22) Filed: May 16, 2019

(65) Prior Publication Data

US 2020/0364247 A1    Nov. 19, 2020

(51) Int. Cl.
*G06F 16/29* (2019.01)
*G06T 7/32* (2017.01)
(Continued)

(52) U.S. Cl.
CPC .......... *G06F 16/29* (2019.01); *G05D 1/0274* (2013.01); *G06F 16/23* (2019.01); *G06N 3/08* (2013.01);
(Continued)

(58) Field of Classification Search
CPC ....... G06F 16/29; G06F 16/23; G05D 1/0274; G05D 2201/0213; G06N 3/08; G06N 20/00; G06T 7/32; G06T 2207/10032; G06T 2207/30184; G06T 7/30; G06V 20/13; G06V 20/582; G06V 20/588; G06V 20/17; G01C 21/005; G01C 21/30; G01C 11/00; G01C 11/02; G01C 11/025; G01C 11/34;
(Continued)

(56) References Cited

U.S. PATENT DOCUMENTS 8,847,982 B2    9/2014  Kmiecik et al.
2004/0167709 A1  8/2004  Smitherman et al.
(Continued)

FOREIGN PATENT DOCUMENTS

WO    2010068186 A1    6/2010
WO    2018104563 A3    7/2018

OTHER PUBLICATIONS

Bosch, Marc et al: "Sensor Adaptation for Improved Semantic Segmentation of Overhead Imagery", 2019 IEEE Winter Conference on Applications of Computer Vision (WACV), IEEE, Jan. 7, 2019 (Jan. 7, 2019), pp. 648-656.
(Continued)

*Primary Examiner* — Kenneth J Malkowski
(74) *Attorney, Agent, or Firm* — Lempia Summerfield Katz LLC

(57) ABSTRACT

An apparatus, or corresponding method, for building or updating a map database is described. In one example, the apparatus includes an image correlation module, a training device, and a learned model or neural network. The image correlation module is configured to correlate a first aerial image and terrestrial sensor data collected at a terrestrial vehicle based on at least one control point from the terrestrial data. The learned model training device is configured to define a learned model based using at least one control point from the terrestrial sensor data as ground truth for analysis of the first aerial image. The learned model inference module is configured to receive a second aerial image and apply the learned model on the second aerial image for identification of mapping information for the map data.

16 Claims, 10 Drawing Sheets

(51) Int. Cl.
  *G06F 16/23*   (2019.01)
  *G06N 20/00*   (2019.01)
  *G05D 1/02*    (2020.01)
  *G06N 3/08*    (2023.01)
  *G06V 20/13*   (2022.01)
  *G06V 20/58*   (2022.01)
  *G06V 20/56*   (2022.01)

(52) U.S. Cl.
  CPC ............... *G06N 20/00* (2019.01); *G06T 7/32* (2017.01); *G06V 20/13* (2022.01); *G06V 20/582* (2022.01); *G06V 20/588* (2022.01); *G05D 2201/0213* (2013.01)

(58) Field of Classification Search
  CPC ........ G01C 11/32; G01C 11/30; G01C 21/28; G01C 21/3841; G01C 21/3852; B64C 2201/127; B64C 2201/123; B64G 1/1021; B64G 2001/1028
  See application file for complete search history.

(56) References Cited

U.S. PATENT DOCUMENTS

| | | | |
|---|---|---|---|
| 2010/0208937 A1 | 8/2010 | Kmiecik et al. | |
| 2011/0282578 A1 | 11/2011 | Miksa et al. | |
| 2016/0005145 A1* | 1/2016 | Seitz | G06T 3/0093 382/154 |
| 2016/0341554 A1* | 11/2016 | Hillier | G05D 1/0808 |
| 2018/0012371 A1* | 1/2018 | Klingner | G06T 7/50 |
| 2018/0218214 A1* | 8/2018 | Pestun | G06T 17/05 |
| 2018/0372493 A1* | 12/2018 | Pilkington | G06T 7/73 |

OTHER PUBLICATIONS

Extended European Search Report issued in related Application No. 20174954.6, dated Oct. 12, 2020 (9 pages).
Wang Jian-Xia et al: "Orthorectification of remote sensing image based on rational function model", 2017 9th International Conference on Modelling, Identification and Control (ICMIC). IEEE, Jul. 10, 2017 (Jul. 10, 2017), pp. 723-727.
Workman, Scott et al: "Wide-Area Image Geolocalization with Aerial Reference Imagery", 2015 IEEE International Conference on Computer Vision (ICCV), IEEE, Dec. 7, 2015 (Dec. 7, 2015), pp. 3961-3969.
Zampieri, Armand et al: "Multimodal Image Alignment Through a Multiscale Chain of Neural Networks with Application to Remote Sensing", Oct. 6, 2018 (Oct. 6, 2018), Advances in Databases and Information Systems; Springer International Publishing, CHAM, pp. 679-696, XP047497251, ISBN: 978-3-319-10403-4.
Pehani, Peter, et al. "Automatic Geometric Processing for Very High Resolution Optical Satellite Data Based on Vector Roads and Orthophotos." Remote Sensing 8(4) 343. Apr. 19, 2016. (pp. 1-26).
Piero, Boccardo, et al. "Orthorectification of High Resolution Satellite Images." 2004. (pp. 1-6).
Uddin, Waheed, and Emad Al-Turk. "Airborne LIDAR Digital Terrain Mapping for Transportation Infrastructure Asset Management." Proceedings, Fifth International Conference on Managing Pavements. 2001. (pp. 1-13).
Van Sickle, Jan L. A Study in Road Geometry Accuracy. Diss. The University of Colorado, 2009. (pp. 1-365).
European Office Action from European Patent Application No. 20174954.6, dated Oct. 10, 2022, 5 pages.

* cited by examiner

AUTOMATIC FEATURE EXTRACTION FROM IMAGERY

FIELD

The following disclosure relates automatic feature extraction from aerial images, and more specifically, automatic feature extraction from a learned model based on control points collection from a terrestrial device.

BACKGROUND

A map database includes data representing a road network or system including road segment data and node data. The road segment data represent roads, and the node data represent the ends or intersections of the roads. The road segment data and the node data indicate the location of the roads and intersections as well as various attributes of the roads and intersections. The road network may be derived from images or other sensor data that is collected for a geographic area.

Creating high-accuracy maps is a costly and difficult endeavor. One approach to achieving high accuracy is to deploy a fleet of industrial capture vehicles equipped with high-quality devices that capture the vehicles position and environment. The pose and estimated positions of the environment's features are then used to construct a model of the world. A deficiency of this approach is its dependence on positioning technology, which loses a great deal of accuracy in urban environments.

Features to define the road network may be manually extracted from images. However, manual extraction of map features is difficult in terms the scalability and efficiency. Challenges have remained in the automatic extraction of map features from images.

SUMMARY

In one embodiment, a method for creating or updating a map database includes receiving at least a first image for a training geographic area, receiving terrestrial sensor data collected at a terrestrial vehicle, identifying at least one control point from the terrestrial sensor data, orthorectifying at least the first image using the at least one control point from the terrestrial sensor data, defining a learned model using at least one control point from the terrestrial sensor data and the orthorectified first image, receiving a second image for an analyzed geographic area, and applying the learned model on the second image for identification of mapping information for the map database.

In another embodiment an apparatus for building or updating map data includes an image correlation module, a learned model training device, and a learned model inference module. The image correlation module is configured to correlate a first aerial image and terrestrial sensor data collected at a terrestrial vehicle based on at least one control point from the terrestrial data. The learned model training device is configured to define a learned model based using at least one control point from the terrestrial sensor data as ground truth for analysis of the first aerial image. The learned model inference module is configured to receive a second aerial image and apply the learned model on the second aerial image for identification of mapping information for the map data.

In another embodiment a non-transitory computer readable medium includes instructions that when executed by a processor are configured to perform identifying sensor data collected for a vehicle for an initial geographic region, identifying a control point from the sensor data, sending the control point to a central device, receiving, from the central device, a map database update for a different geographic region, providing the map database update to a mapping application or a navigation application.

BRIEF DESCRIPTION OF THE DRAWINGS

Exemplary embodiments of the present invention are described herein with reference to the following drawings.

DETAILED DESCRIPTION

Figure 1:
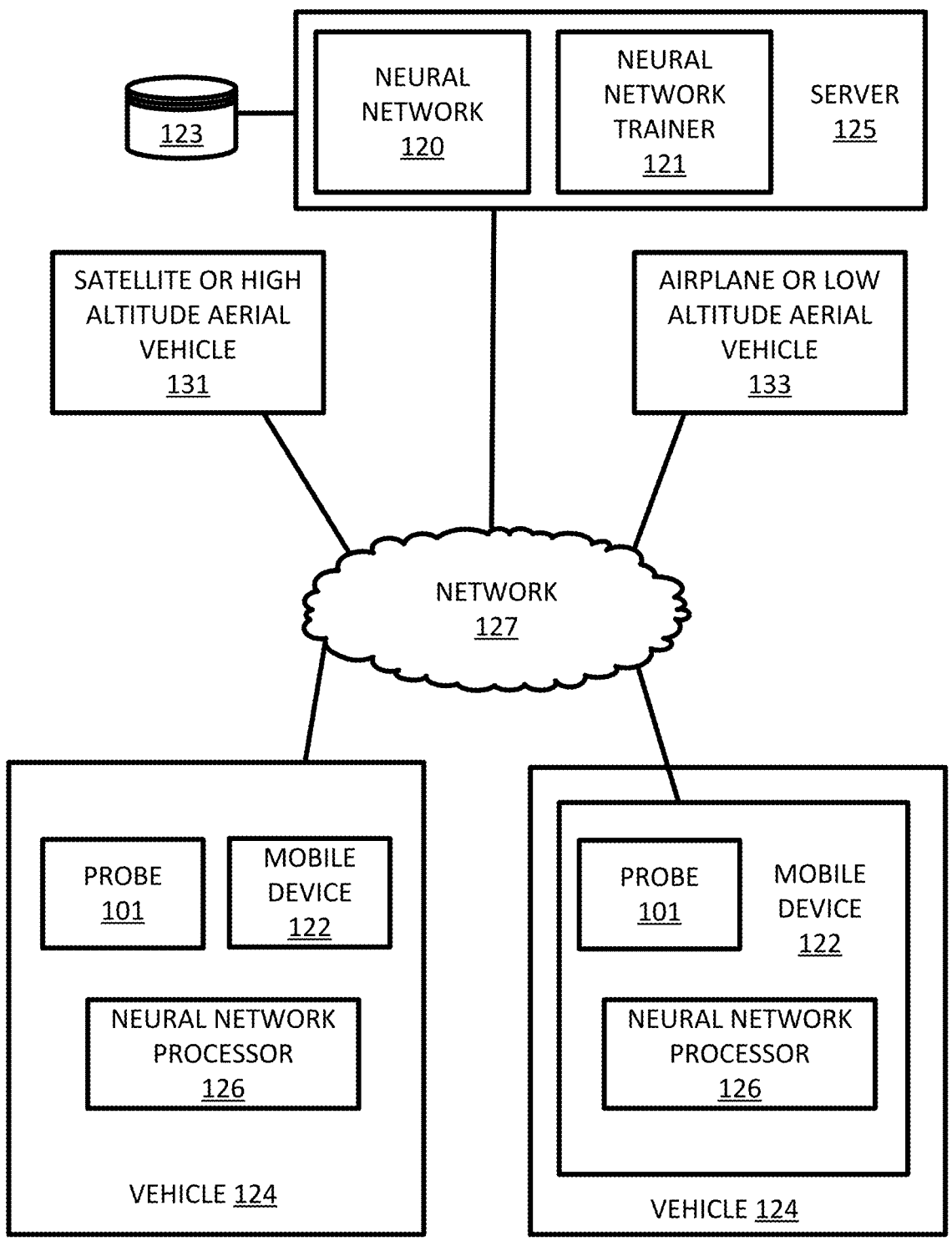
FIG. 1 illustrates an example system for the automatic extraction of map features from imagery.

The term photogrammetry refers to one or more measurements made from photographs. Manual photogrammetry may involve a human taking measurements on a photograph. Computer aided software may assist in photogrammetry but may require user intervention. The following embodiments include automatic photogrammetry where no user intervention is required.

The term aerial images may include images collected by at least one camera at least a minimum distance from the surface of the earth. Aerial images may include high altitude aerial images and low altitude aerial images. High altitude aerial images may be collected from a high altitude aerial vehicle having a distance from the earth's surface greater than a high altitude threshold. An example of a high altitude vehicle is a satellite orbiting earth. Low altitude aerial images may be collected from a low altitude aerial vehicle having a distance from the earth's surface greater than a low altitude threshold and/or less than high altitude threshold. An example of a low altitude vehicle is an airplane.

The term learned model may include any machine learning device or other algorithm for analyzing data without explicit instructions. The learned model develops a model for analyzing sample data based on prior sample data, which may be referred to as training data. An example learned model includes a neural network. The neural network may be implemented by a neural network device and include one or more modules including a training module and an inference module. Other learned models besides a neural network are possible and described herein.

The following embodiments include a learned model for the identification of map information from one or more images for a route or geographic area. Check points for the route or geographic area are derived from an existing database or otherwise collected by a collection vehicle traveling on the ground in the geographic area. Aerial photogrammetry of the route or geographic are is collected through flying the route. Points and lines derived from the aerial photogrammetry, which may describe road lines, signs, poles, lane lines, road boundaries and barriers, are tested with the check points. For example, the check points may provide the ground truth set of training data for a learned model. The learned model may be applied to satellite imagery or other aerial imagery as automatic extraction tools. Iterations of the automatic extraction tools may be run on aerial imagery, satellite image, or on both test beds. Through the incremental improvements derived from these iterations the accuracy and reliability of the resulting lane line and road boundary geometries is increased. This system produces automatically extracted lane line and road boundary geometry from both satellite imagery and the aerial imagery that meet accuracy requirements of automated driving and other high definition map applications. For example, identified features or objects may be applied to autonomous driving systems or assisted driving systems. The autonomous driving systems may generate driving commands in response to the map information including the location of lanes or objects. The assisted driving systems may generate driver warnings or supplemental assistance commands in response to the map information. Localization also may be performed in response to the identified objects or features. For example, the location of a user or vehicle may be determined according to the known map information in the vicinity of the user or vehicle.

The following embodiments relate to several technological fields including but not limited to navigation, autonomous driving, assisted driving, traffic applications, and other location-based systems. The following embodiments achieve advantages in each of these technologies because improvements in the detection of map information improves the effectiveness, efficiency, and speed of specific application in these technologies. In each of the technologies of navigation, autonomous driving, assisted driving, traffic applications, and other location-based systems, the automated identification of map information in collected images improves the technical performance of the application and reduces the manual labor and other resources necessary to identify map information. The manual labor is reduced in both the collection of ground level images and the manual identification of features from images. In addition, users of navigation, autonomous driving, assisted driving, traffic applications, and other location-based systems are more willing to adopt these systems given the technological advances in automated identification of map information.

FIG. 1 illustrates an example system for the automatic extraction of map features from imagery. The system includes a server 125 for analyzing images from one or more image collection devices, which may include any combination of a mobile device 122, a satellite or other high altitude aerial vehicle 131, and an airplane or other low altitude aerial vehicle 133. The server 125 and the image collection devices are connected by a network 127 and communicate through the network 127. The server 125 may include a neural network or other learned model 120 and a neural network trainer or other learned model trainer 121, which may be referred to collectively or individually as the neural network controller. The neural networks may be stored in database 123, which may additionally include a geographic database or map database. Additional, different, or fewer components may be included.

As a collection device, the mobile device 122, or vehicles 124, collect probe data including coordinates for position or data indicative of surrounding objects. The probe data may include object data including an object identifier that describes the object detected and position data that describes the position of the object. The probe data may include position data for the collection device as determined by a global navigation satellite system (GNSS), a light detection and radar (LiDAR) system, or a camera or other imaging system.

Each vehicle 124 and/or mobile device 122 may include a LiDAR system or other distance data detection sensor configured to generate a point cloud describing the surroundings of the system. The distance data detection sensor may include a laser range finder that rotates a mirror directing a laser to the surroundings or vicinity of the collection vehicle on a roadway or another collection device on any type of pathway.

Each vehicle 124 and/or mobile device 122 may include a camera that collects images. The images may be analyzed to identify objects or particular features in the image using an image processing technique. Image processing techniques applied to the image data may include edge detection or feature transform (e.g., scale-invariant feature transform (SIFT)). The image processing technique may utilize feature vectors. For example, a library of feature vectors from possible expected address formats may be compared to a set of feature vectors calculated from the collected image.

Each vehicle 124 and/or mobile device 122 may include position circuitry (e.g., probe 101) such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The probe data may be used as control points. The control points are points that are associated with an object or other feature, which can be used to define or train a learned model. The control points may be points in the distance data (e.g., for LiDAR) or pixels in the image. In one example, the control points are associate with particular features such as lane lines or road signs. In another example, the control points are points having a confidence value greater than a threshold. When the control point is analyzed to identify the object or other feature, the confidence value is calculate based on the analysis. Only points that identified with a high confidence are designated as control points.

The server 125 may identify potential control points from the probe data and select one or more control points based on confidence levels or other characteristics of the control points. The server 125 may select one or more control points based on horizontal accuracy in a predetermined range (e.g., error range: 3.8 cm from 0.2 cm to 4 cm) or a reliability range (e.g., +/−0.6 cm at 99.7%), and/or vertical accuracy in a predetermined range (e.g., error range: 10.8 cm from −6.1 cm to +4.7 cm) or the reliability range.

The high altitude aerial vehicle 131 may be a satellite or other orbiting device. The high altitude aerial vehicle 131 collects image data for a geographic area from a height greater than a high altitude threshold. The high altitude aerial vehicle 131 may include one or more cameras, light sensitive sensors, or a charge coupled device (CCD) configured to collect images for the surface of the earth. The high altitude aerial vehicle 131 may follow a predetermined orbit around the earth. In some examples, the high altitude aerial vehicle 131 may follow a path selected based on the location of the geographic area for imaging. For satellites as the high altitude aerial vehicle 131, the high altitude threshold may be 1000 miles, 10,000 miles, or 20,000 kilometers, or another altitude for a geosynchronous orbit.

The low altitude aerial vehicle 133 may be an airplane, helicopter, unmanned aerial vehicle, drone or other device configured to collect images of the surface of the earth from a low altitude. The low altitude aerial vehicle 133 may fly above the geographic area from a height greater than a low altitude threshold, or less than the high altitude threshold. The low altitude threshold may be 50 meters, 100 meters, 100 miles or another altitude.

The following embodiments include systems and processes for generating map data stored in the geographic database 123. In addition, the mobile devices 122 may include local databases corresponding to a local map, which may be modified by to the server 125 using the geographic database 123. The local map may include a subset of the geographic database 123 and is updated or changed as the vehicles 124 travel. The mobile devices 122 may be standalone devices such as smartphones or devices integrated with vehicles. In some embodiments the local maps are modified according to data collected by the mobile device 122 or vehicle 124. In other embodiments, the collected data is transferred to the server 125 for augmenting the geographic database 123.

The mobile device 122 may include mapping applications, navigational applications, or driving applications, which utilize the map data stored in the geographic database 123. The driving applications may calculate driving commands for controlling a vehicle. The driving applications may generate warnings or other messages for a driver or passenger of the vehicle. Localization may be performed using the neural network analysis of data collected at the vehicle. In localization, objects or features detected from the sensor are compared to a fingerprint or template of known objects or features that is tied to a geographic location. The mapping applications may provide maps including the location of the vehicle as determined by the localization. The navigational applications may present routes (e.g., turn-by-turn directions) that are calculated according to the neural network analysis of data collected at the vehicle.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
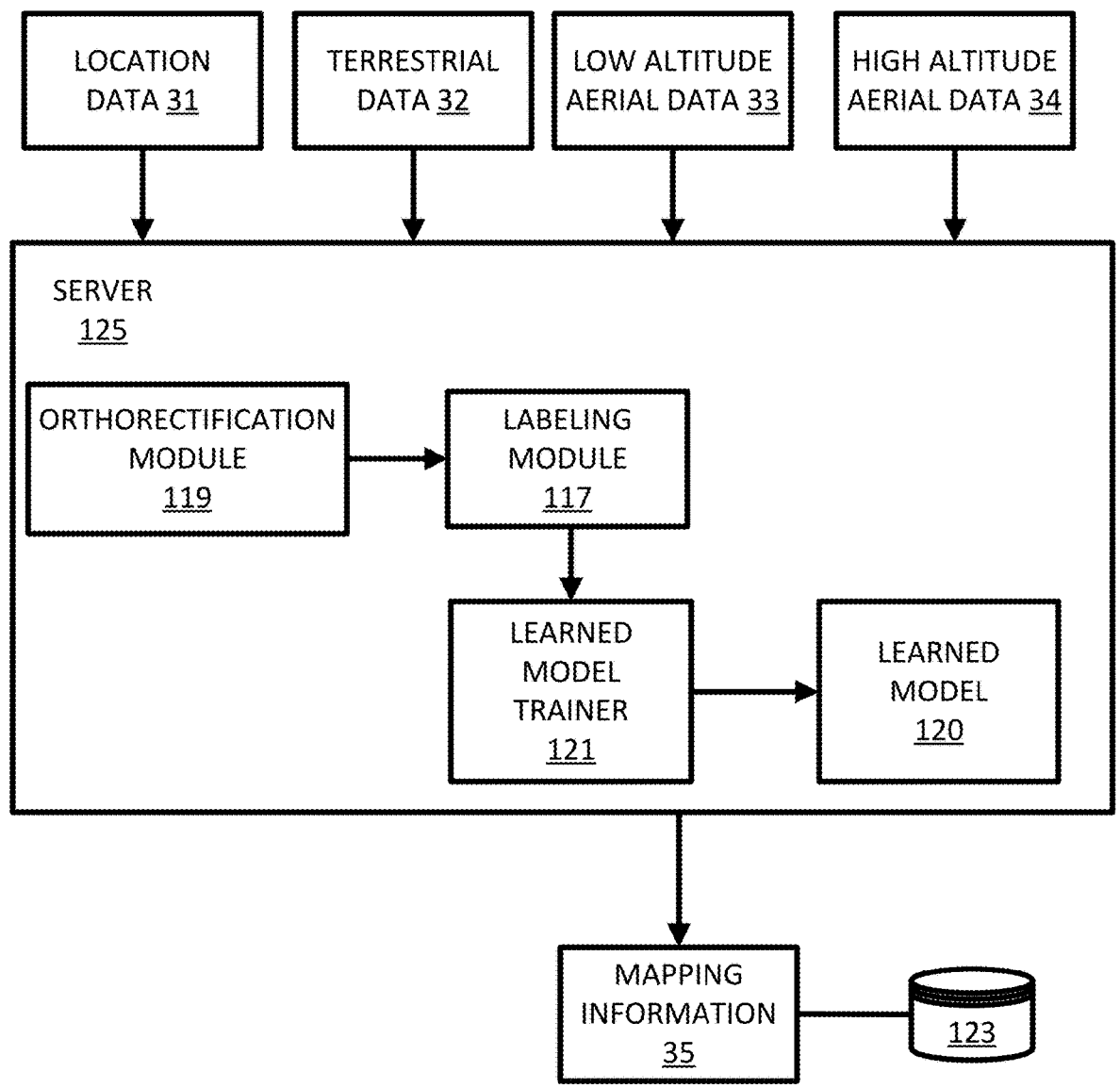
FIG. 2 illustrates an example framework for the controller of the system of FIG. 1.

FIG. 2 illustrates an example framework for the controller of the system of FIG. 1. FIG. 2 includes the server 125 to implement an orthorectification module 119 (image correlation module), a labeling module 117, a learned model trainer 121, and a learned model 120. The server 125 receives data from collection devices and the data includes one or more of location data 31, terrestrial data 32, low altitude aerial data 33, and high altitude aerial data 34. The server 125 outputs mapping information 35 from the learned model 120. The mapping information 35 may be provided to or stored in the database 123. Additional, different, or fewer components may be included.

The orthorectification module 119 is configured to correlate an aerial image collected at a low altitude aerial vehicle and/or a high altitude aerial vehicle and terrestrial sensor data collected at a terrestrial vehicle and including one or more control points. As described above, the probe data collected by the mobile device 122 and/or vehicle 124 may be terrestrial sensor data including the control points. The orthorectification module 119 calculates a relationship between the aerial image at the control points.

The control points may be determined from object recognition in the probe data (e.g., image data, LiDAR data, or other sensor data). That is, shapes or features identified in the probe data may be compared to a template to identify the objects. Certain objects may be used as control points. Example objects suitable for control points may include signs, lane lines, or poles.

The control points may be defined according to the accuracy of the probe data. The orthorectification module 119 determines whether an object is suitable as a control point based on an object recognition algorithm. For example, the success of the object recognition algorithm for a particular object may be measured by a confidence value. When the confidence value exceeds a threshold, the orthorectification module 119 determines that the object is suitable for a control point.

The control points may be defined according to a match between the probe data and photo-identifiable points in the low altitude aerial image. The orthorectification module 119 may analyze the image using an image processing technique such as edge detection or feature transform. The orthorectification module 119 identifies the corresponding feature in the terrestrial sensor data. When the feature identified from the probe data matches the feature identified from the low altitude aerial image, the orthorectification module 119 may designate one or more points or pixels for the matching feature as the control point.

In one example, the control points may be identified by the orthorectification module 119 according to geographic placement. For example, control points from the probe data may be selected according to geographic spacings in the low altitude aerial image. Control points may selected near each of the edges or corners of the image and at the center of the image. In another alternative, the control points are identified by a user.

The orthorectification module 119 is configured to orthorectify the low altitude aerial image based on the at least one control point. The aerial images are collected at time intervals as the low altitude aerial vehicle 133 flies over the geographic area. Depending on how the low altitude aerial vehicle 133 is positioned with respect to various objects, the objects may appear at an angle in the image. Orthorectification is the process of removing the effects of the tilt (e.g., angle from the perpendicular line of the camera) or image perspective of objects and/or the relief or effects of the objects due to terrain (e.g., due to change in elevation or slope of the ground). The result of orthorectification is a planimetrically correct image in which all of the objects appear at the same angle in the image and at a contract scale. When the image orthorectified, distances, angles, sizes of objects, and areas may be accurately measured.

The orthorectification module 119 is configured to perform the orthorectification based on one or more detected parameters. The parameter may be a characteristic of the low altitude aerial vehicle 133. The characteristic of the low altitude aerial vehicle 133 may be an altitude or an angle (e.g., a roll, a pitch, or a yaw). The orthorectification module 119 may calculate at least one resultant image feature that reduces distortion from the characteristic of the low altitude aerial vehicle 133.

In some examples, orthorectification module 119 is configured to filter the probe data so that certain portions of the probe data are used for orthorectification and other portions of the probe data are discarded (e.g., deleted from memory). The probe data may be filtered according to geographic region. Urban areas may be discarded or otherwise removed from the orthorectification process, and rural areas may be retained and used for orthorectification. Urban areas and/or rural areas may be identified by the orthorectification module 119 based on a designation in the geographic database 123. Urban areas and/or rural areas may be identified by the orthorectification module 119 based on proximity to a city center. Urban areas and/or rural areas may be identified by the orthorectification module 119 based on a quantity of road segments in the geographic area (e.g., urban areas may have more than a specified quantity of road segments and rural areas may have less than the specified quantity of road segments). Urban areas and/or rural areas may be identified by the orthorectification module 119 based on the functional classification of road segments in the geographic area.

The learned model 120 may include one or more neural networks. A neural network may include a network of coefficients or weights that based on the contents of the training data including the identified objects based on the control points. The network of coefficients or weights may be arranged in layers (e.g., convolutional layers).

The label module 117 or the learned model training device 121 configured to identify at least one control point based on the terrestrial sensor data and the aerial image of the geographic area. To designate the geographic area is used for training, it may be referred to as the training geographic area. The learned model training device 121 is configured to define a learned model based using at least one control point form the terrestrial sensor data as ground truth for analysis of the aerial image. The labeling module 117 may segment the aerial image and assign one or more labels to features in the aerial image based on the control points. The labels may identify the features in the aerial image based on data from the control points. The labels may identify a unique object identifier. The labels may identify a classification for the objects (e.g., lane line, building, road sign, or other objects). The label module 117 may provide image label pairs (image location and identity) to the learned model training device 121.

The learned model 120 or learned model inference module applies the trained model. The learned model 120 is configured to receive an aerial image, which may be a satellite image, collected at a high altitude aerial vehicle, and apply the learned model on the satellite image for identification of mapping information for the map database. The satellite image may depict a different or the same geographic area. The geographic area in the satellite image may be referred to as the analyzed geographic area. The learned model may include one or more neural networks such as convolutional neural networks. Alternatively, the learned model may include one or a combination of a support vector machine (SVM), boosted and bagged decision trees, k-nearest neighbor, Naïve Bayes, linear discriminant analysis, logistic regression, and/or another example. The learned model may be an iterative process include multiple iterative operation based on a series of images for the low altitude aerial vehicle and the high altitude aerial vehicle, which updates one or more weights or coefficients for the neural network.

The learned model 120 may include a first model for analysis of the low altitude aerial image and a second model for the high altitude aerial image. The first model and the second model may be independent. The first model may include a first set of weights or coefficients and the second model may include a second set of weights or coefficients.

The learned model 120 outputs mapping information. The mapping information may include the coordinates for a location of a navigation object and/or the identity of the navigation object. The navigation object may be a feature included in the geographic database 123 for defining a road network or an object in the vicinity of the road network. The navigation object may include a road sign, a building, a path, a roadway, a lane line, a guardrail, a road barrier, a bridge, or another feature.

The learned model 120 may generate different types of output, and the mapping information may be various formats. The mapping information may include one or more pixel values, which corresponds to the learned model 120 as a semantic segmentation model. The pixel values may include a predetermined value (e.g., black or 255) for pixels that have been identified by the learned model 120 as being part of the navigation object. Alternatively, the mapping information may include a polyline, which corresponds to the learned model 120 as a polyline model. The polylines may define a line based on piecewise portions, which corresponds to an outline of an object or a path of roadway or other path. The polyline model outputs coordinates for at least one polyline for the mapping information.

In one example, the orthorectification module 119 is configured to perform orthorectification on the high altitude aerial image based on one or more detected parameters. The parameter may be a characteristic of the high altitude aerial vehicle 131. The characteristic of the high altitude aerial vehicle 131 may be an altitude or an angle (e.g., a roll, a pitch, or a yaw). The orthorectification module 119 may calculate at least one resultant image feature that reduces distortion from the characteristic of the high altitude aerial vehicle 131.

Figure 3:
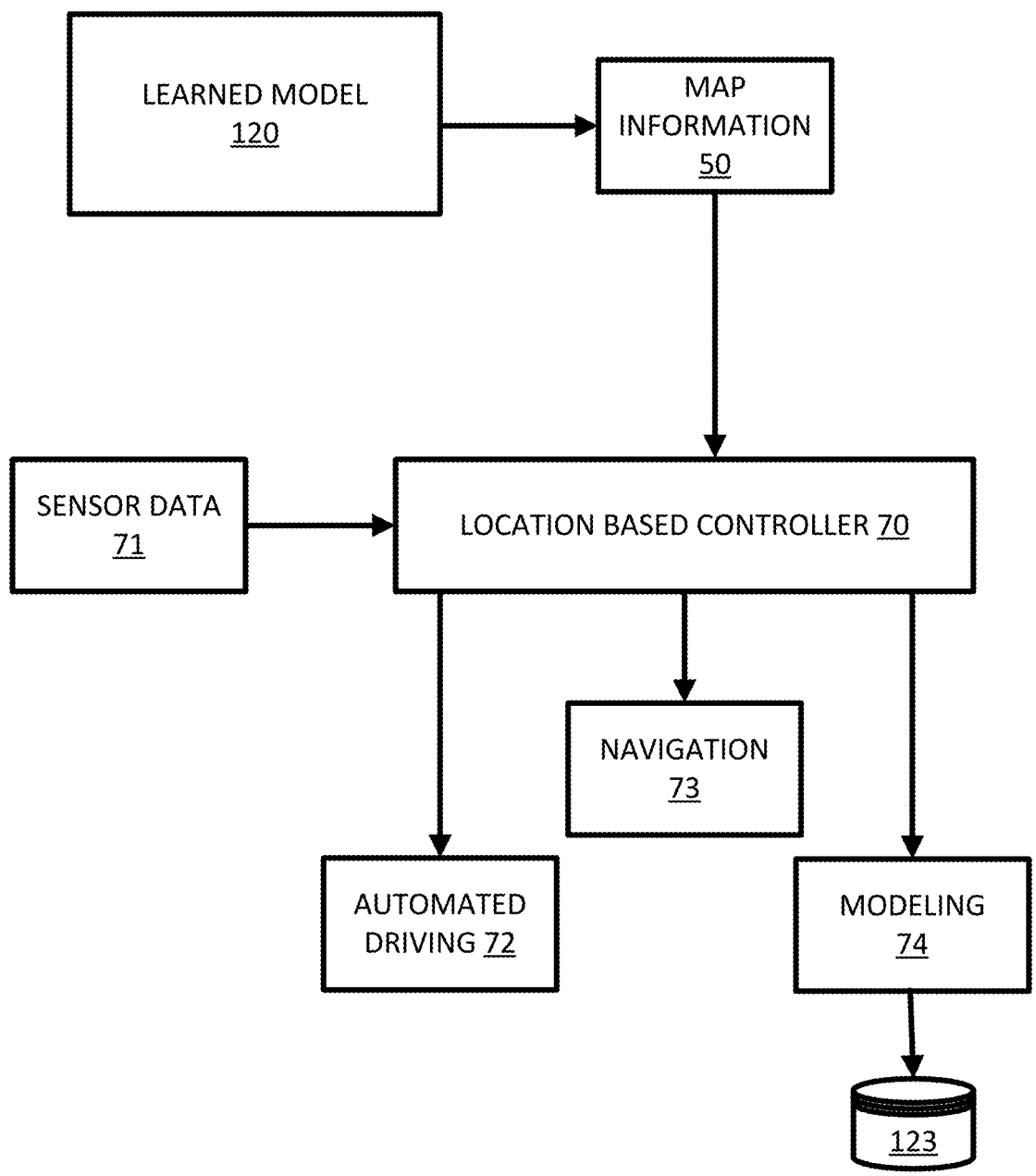
FIG. 3 illustrates example application for the map features extracted by the system of FIG. 1.

FIG. 3 illustrates example application for the map features extracted by the system of FIG. 1. The learned model 120 may provide map information 50 by location coordinates and/or object identifiers to an external device such as a location based controller 70. The location based controller 70 may collect sensor data 71 from one or more other sources. Based on the combination of the sensor data 71 and the map information 50, the location based controller 70 provides automated driving 72, navigation 73, and/or modeling 74. The location based controller 70 may include a communication interface or device configured to provide data for the map information 50 to an external device to provide automated driving 72, navigation 73, and/or modeling 74. Additional, different, or fewer combinations may be included.

The location based controller 70 may calculate a route from an origin to a destination. The origin and/or the destination may be received at the server 125 from the vehicle 124 and the route is calculated from the geographic database 123. Alternatively, the route may be calculated from the local database. The route includes multiple segments stored in either of the databases. The route may be calculated according to the shortest distance, based on length or distance of the set of road segments, or according the estimated time to traverse the set of road segments. Example routing techniques include the A* algorithm and the Dykstra algorithm.

The route may be defined or modified in response to the map information 50. For example, when the map information 50 includes a roadway, the route may incorporate the new roadway. Similarly, when the map information 50 includes an attribute for the roadway such as speed limit, construction, a stop light, or a curve, the routing algorithm may consider the cost of the attribute in calculating the route.

For automated driving, the location based controller 70 may generate a driving command in response to the map information 50. In one example, the driving command may instruct the vehicle to change lanes, increase speed, decrease speed, or make a turn based on the map information 50. Additional examples of driving commands are discussed below.

The location based controller 70 may generate a warning in response to the map information 50. The warning may be provided via mobile device 122 or vehicle 124 to a driver. The warning may instruct the driver to changes lanes or avoid a roadway. The mobile device 122 or vehicle 124 may include an annunciator configured to provide the warning in response to the map information 50. The annunciator may include a speaker or a display for conveying the warning.

For modeling, the location based controller 70 may generate a three-dimensional model in response to the map information 50. The three-dimensional model may represent the shape of the roadway and one or more objects near the roadway. For example, the three-dimensional model may depict barriers, road signs, buildings, poles, or other objects.

For modeling, the location based controller 70 may generate a map that includes the dangerous location in response on the map information 50. The location based controller 70 may store the map in the geographic database 123. The map may include a first designation for new objects included in the map information 50 and a second designation for existing map data for the roadway in the geographic database 123. The first designation and the second designation may be different colors, different outlines for the lanes, text labels, or other indicia.

Figure 4:
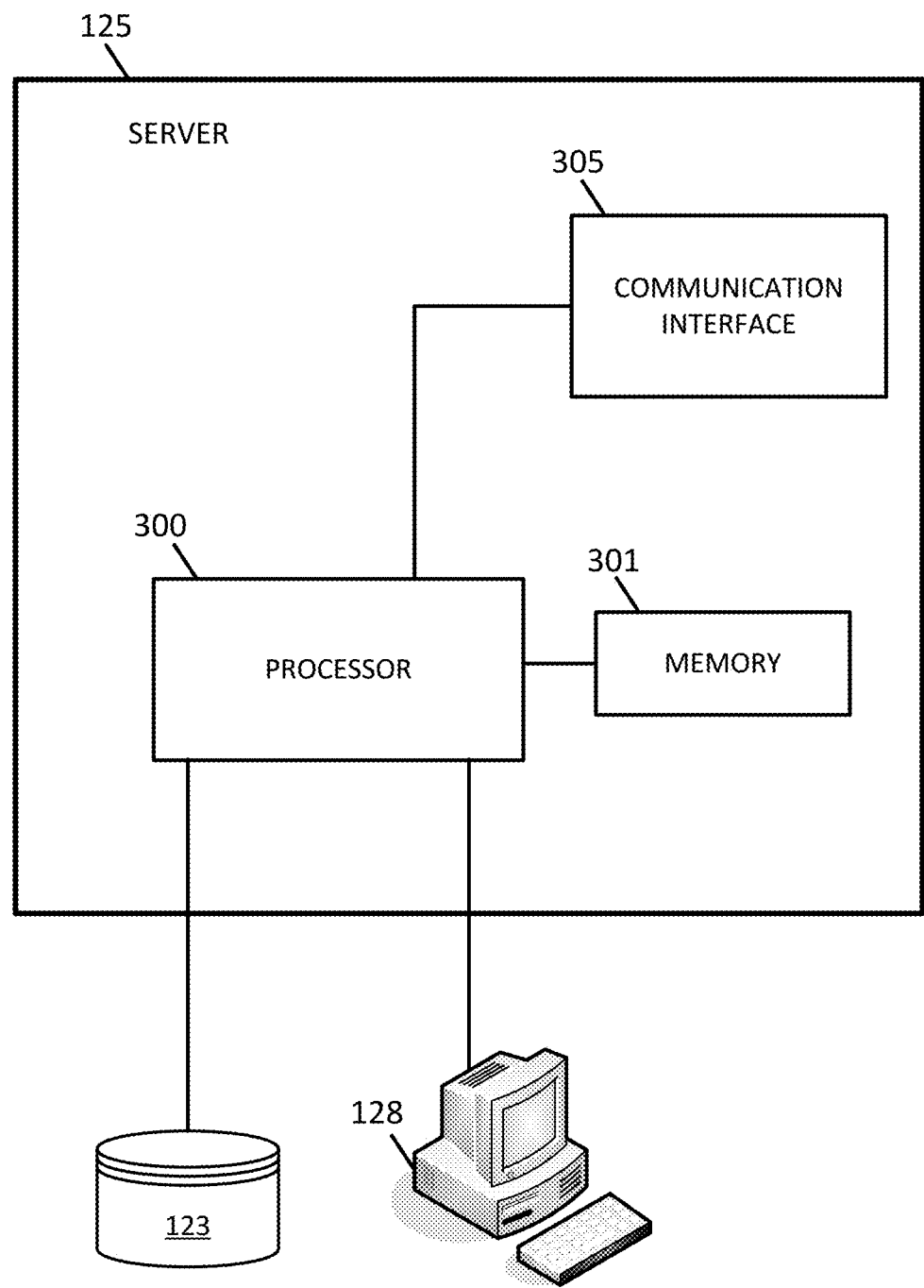
FIG. 4 illustrates an example server implementation of the neural network controller.
Figure 5:
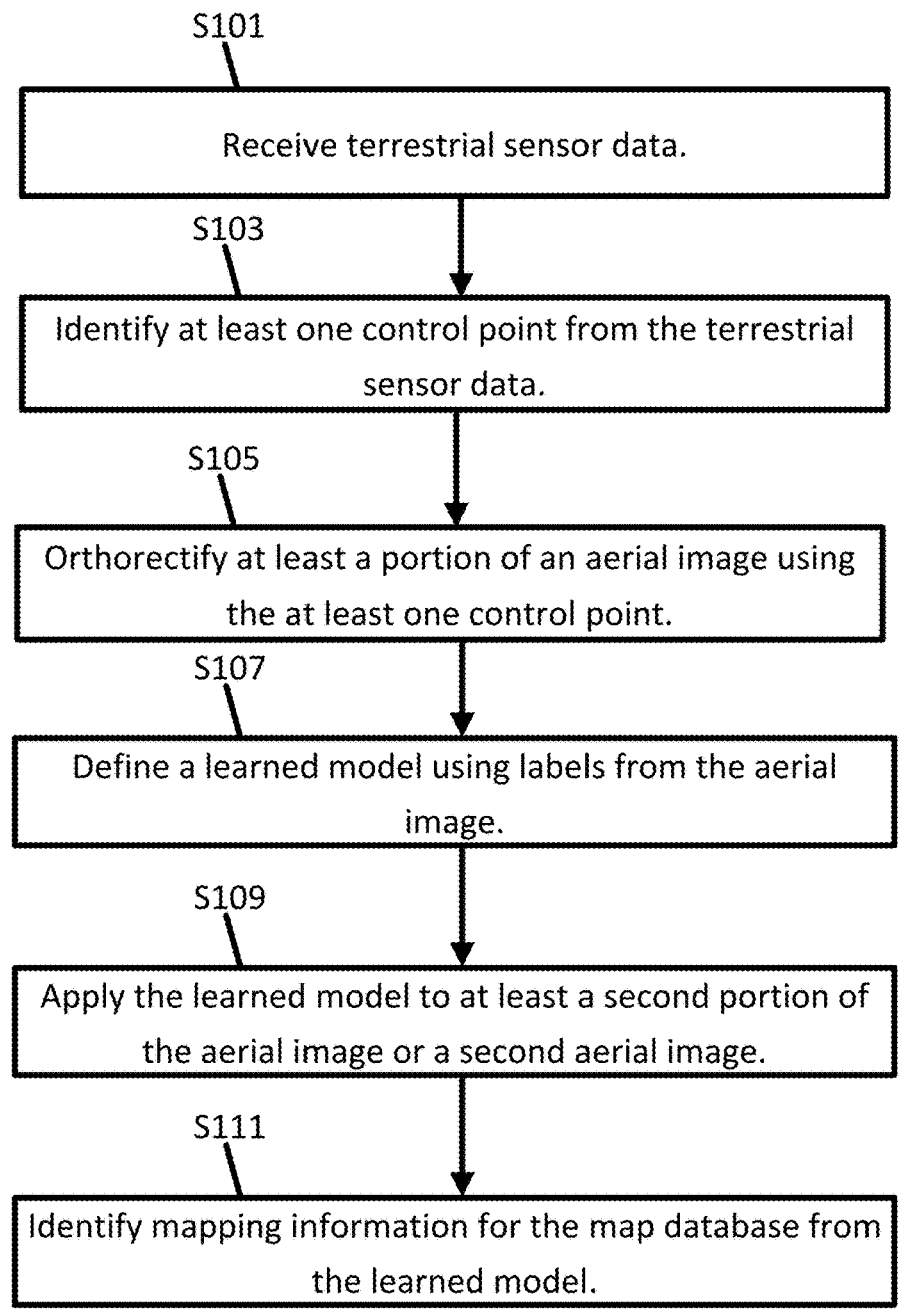
FIG. 5 illustrates an example flow chart for the operations of the server.

FIG. 4 illustrates an example server implementation of the neural network controller. FIG. 4 illustrates an example server 125, which may apply to the system of FIG. 1. The server 125 includes a processor 300, a communication interface 305, a memory 301, and a database 123. An input device (e.g., keyboard or personal computer 128) may be used to enter settings to the server 125. The settings may include settings for thresholds and other user preferences described herein. The settings may include the model that is used for the neural network (e.g., polyline or segmentation model), the types of objects identified from the neural network, the number of neural networks, the types of neural networks, and/or the number of layers of the neural networks. Additional, different, or fewer components may be provided in the server 125. FIG. 5 illustrates an example flow chart of the server 125 for the neural network controller.

At act S101, the processor 300 or the communication interface 305 receives input data or images. For example, the processor 300 or the communication interface 305 may receive terrestrial sensor data. The terrestrial sensor data may be images collected by a camera near the ground surface or a distancing system such as LiDAR or radar. The sensor may be mounted or otherwise incorporated with a vehicle. The communication interface 305 is an example means for receiving the terrestrial sensor data. In addition, the processor 300 or the communication interface 305 receives at least one aerial image. The first aerial image depicts the surface of the earth and may be collected from a drone, an airplane, or a satellite. The aerial images may include multiple patches, tiles, or other portions that together cover a geographic area under analysis. The communication interface 305 is an example means for receiving the first aerial image.

At acts S103 and S105, the processor 300 analyzes the aerial image in combination with the terrestrial sensor data. As the terrestrial sensor data is considered accurate (e.g., ground truth), the processor 300 may modify the aerial image using the terrestrial sensor data. At act S103, the processor may identify at least one control point to perform the modification. The control points may be points having predetermined coordinates. The control points may be points that match between the aerial image and the terrestrial sensor data. The control points may be predetermined types of objects detected in the terrestrial sensor data. The processor 300 may include a control point module including an application specific module or processor that identifies the control points from the terrestrial sensor data and/or first aerial image. The processor 300 is an example means for identifying the control points from the terrestrial sensor data and/or first aerial image.

At act S105, the processor 300 orthorectifies at least a portion of the aerial image using the at least one control point. The control point may include a location of an object, an identity of an object, and/or a geometric shape of an object. The processor 300 may determine one or more angles from the control point in the terrestrial data and, in response, modify the corresponding object in the aerial image. Such orthorectification may remove the effects of the height, ground slope, or ground terrain in the aerial image. When the image orthorectified, distances, angles, sizes of objects, and areas may be accurately measured.

The processor 300 may include an orthorectification module including an application specific module or processor that identifies the control points from the terrestrial sensor data and/or aerial image. The processor 300 is an example means for orthorectifying the control points from the terrestrial sensor data and/or aerial image.

Acts S101, S103, and/or S105, in any combination, may be repeated for a predetermined number of times in an iterative loop for a geographic area. In one example, the geographic area may correspond to a training geographic area, and in another example, the geographic area may correspond to the combination of the training geographic area and an analyzed geographic area. The geographic area may be divided into smaller geographic areas, represented my image patches and/or map tiles. The processor 300 may iteratively process the smaller geographic areas in a predetermined order.

At act S107, the processors defines a learned model based on the control points and/or the aerial image. The learned model is trained based on ground truth including pixel data for objects in the aerial image and their known locations within the image. The ground truth may be defined according to the control points or the identified objects in the first aerial image. The processor 300 may include a training module including an application specific module or processor that trains the learned model. The processor 300 is an example means for defining a learned model.

The processor 300 or the communication interface 305 receives a second or additional aerial image. The additional aerial image depicts the surface of the earth and may be collected from a drone, an airplane, or a satellite. The additional aerial image may be the same or different type of image than the first aerial image. The communication interface 305 is an example means for receiving the second aerial image.

At act S111, the processor 300 applies the learned model to the additional aerial image for identification of mapping information. That is, based on the trained learned model, pixel values from the additional aerial image are analyzed to identify one or more objects in the additional aerial image. The one or more objects may be translated to map data that is stored in the map database. For example, when the object identified from the learned model is a speed limit sign, the speed limit may be stored as an attribute of the corresponding road in the map database. When the object identified from the learned model is a stop sign or stop light, an intersection may be stored in the map database. When the object identified from the learned model is a lane line or road boundary, the lane or road is added to the map database. The map database may be stored in database 123 or memory 301. The processor 300 may include a learned model module including an application specific module or processor that applies the learned model. The processor 300 is an example means for applying the learned model.

Figure 6:
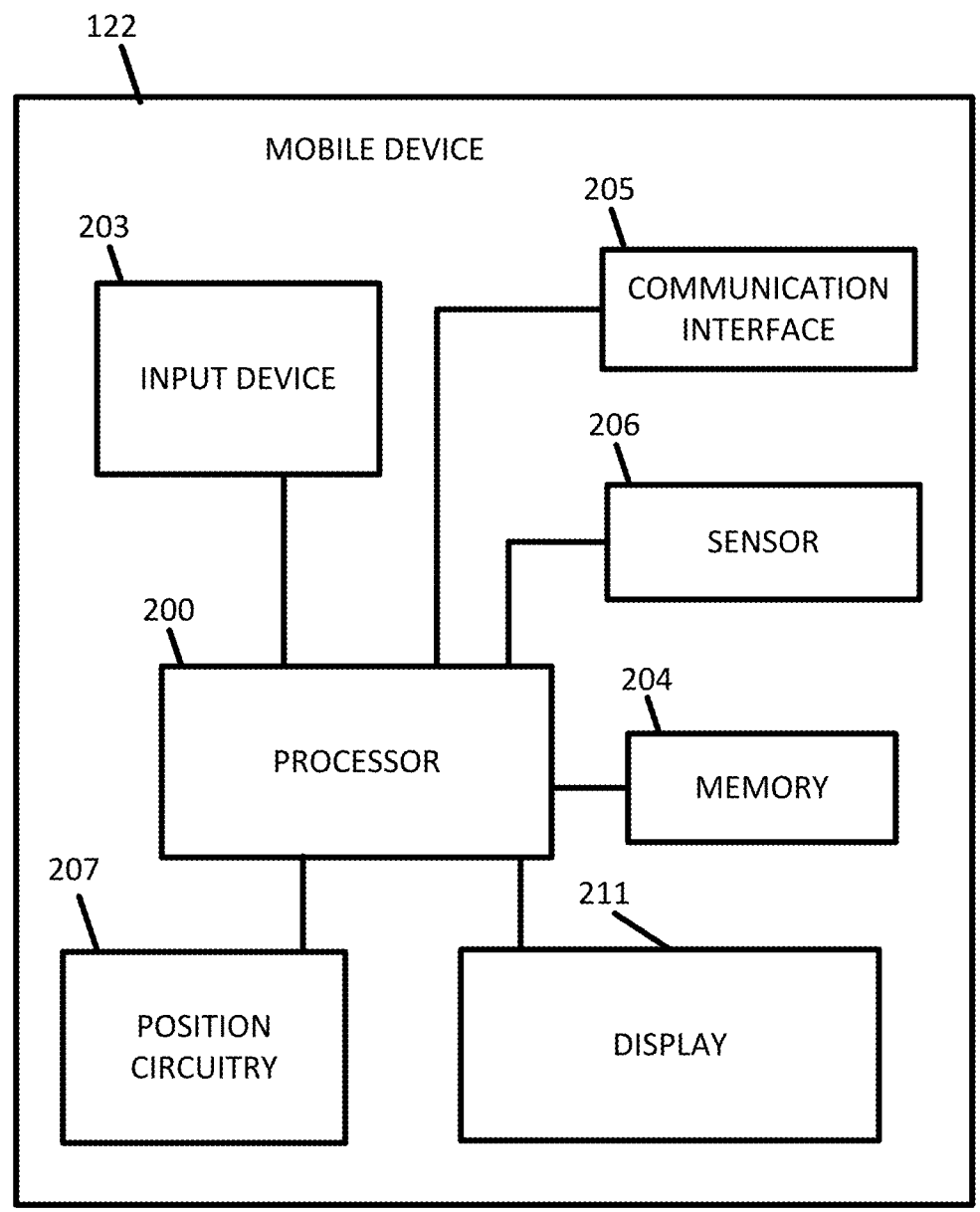
FIG. 6 illustrates an example mobile device implementation of the feature extraction controller.

FIG. 6 illustrates an exemplary mobile device 122 of the system of FIG. 1. The mobile device 122 includes a processor 200, a memory 204, an input device 203, a communication interface 205, position circuitry 207, a display 211, and a sensor 206. The sensor 206 may include one or more of the sensors described with respect to FIG. 8. The input device 203 may receive commands from the user for default settings for the learned model. The default settings may include the number or layers or nodes for the learned model, the types of objects that are identified from the images, the types of changes that are made to the map database, and other parameters. Additional, different, or fewer components are possible for the mobile device 122.

Figure 7:
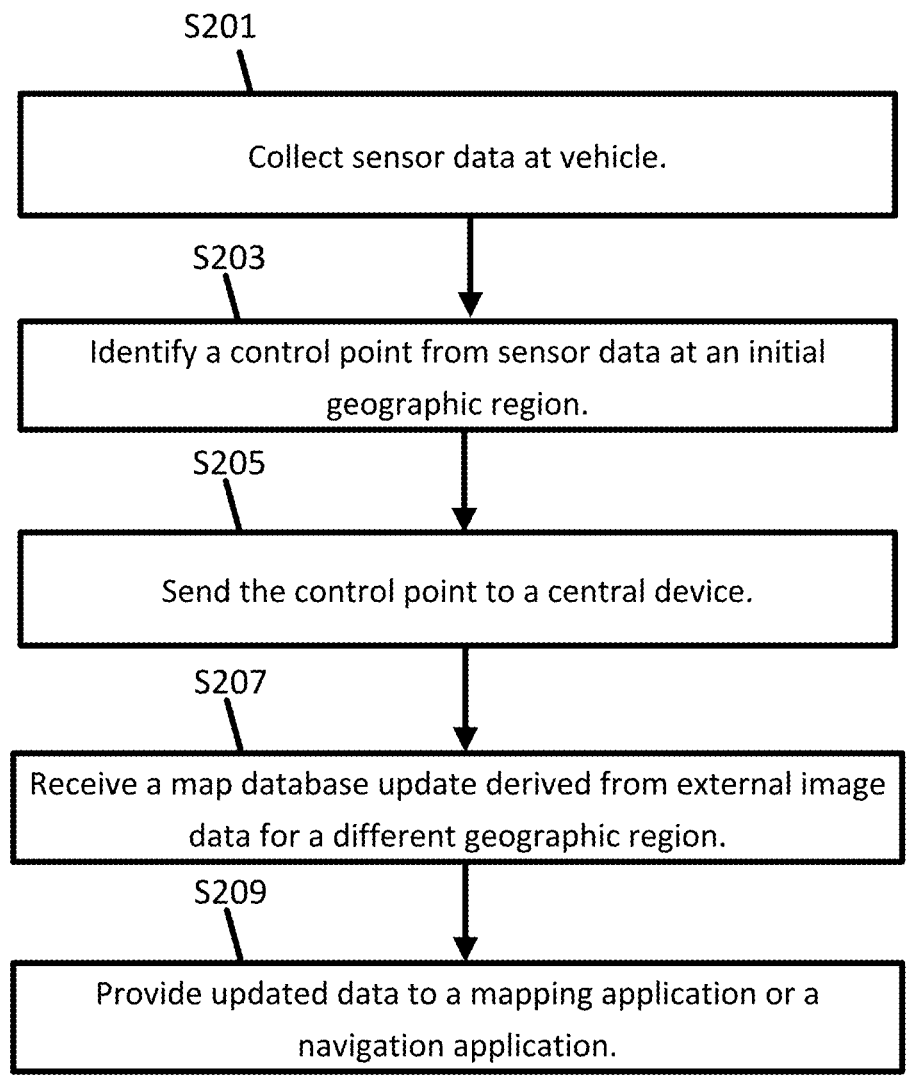
FIG. 7 illustrates an example flow chart for the operations of the mobile device.

FIG. 7 illustrates an example flow chart for the operation of the mobile device 122. Additional, different, or fewer acts may be provided.

At act S201, the sensor 206 collects local terrestrial data for the mobile device 122. The sensor 206 may include a camera, a LiDAR device, or another sensor described herein. In some examples, the mobile device 122 is a portable computer or smart phone and in other examples the mobile device 122 is a vehicle. The sensor 206 is means for collecting sensor data at the mobile device.

At act S203, the processor 200 identifies a control point from the sensor data at an initial geographic region. The initial geographic region may be the area in which the mobile device 122 is traveling. At act S205, the communication interface 205 sends the control points to a central device (e.g., server 125). As described herein, the central device analyzes and modifies one or more aerial images using the control points. The aerial images may orthorectified using the control points. The control points are also used to train a learned model for automatically detecting features from subsequent aerial images. In some examples, the learned model is trained directly from the control points, and in other examples, the learned model is trained from aerial images modified based on the control points. At act S205, S207 the processor 200 or the communication interface 205 receives a map database update derived from one or more external images such as the subsequent aerial images for a different geographic region. In this way, the accuracy of the terrestrial data is applied to analysis of aerial images of a much large geographic area.

At act S209, the processor 200 provides the updated data to a mapping application or a navigation application as described herein. The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly.

The following examples describe applications for the output of the neural network or other learned model downloaded in response to driving conditions. In some examples, the output describes one or more objects in the vicinity of the vehicle. The vehicle driver may be presented with a warning in response to the objects in the vicinity of the vehicle. The vehicle may be controlled in response to the objects in the vicinity of the vehicle. The vehicle control may be a primary control such as brake, steering, or accelerator. The vehicle control may be a secondary control such as tire pressure, gear, turn signal, or others. The vehicle control may be an auxiliary control such as headlights, radio volume, seat recline, or others. The output of the neural network may be used to determine the position of the vehicle. The output of the neural network or other model may be the basis of navigation or routing for the vehicle 124 or the mobile device 122.

Figure 8:
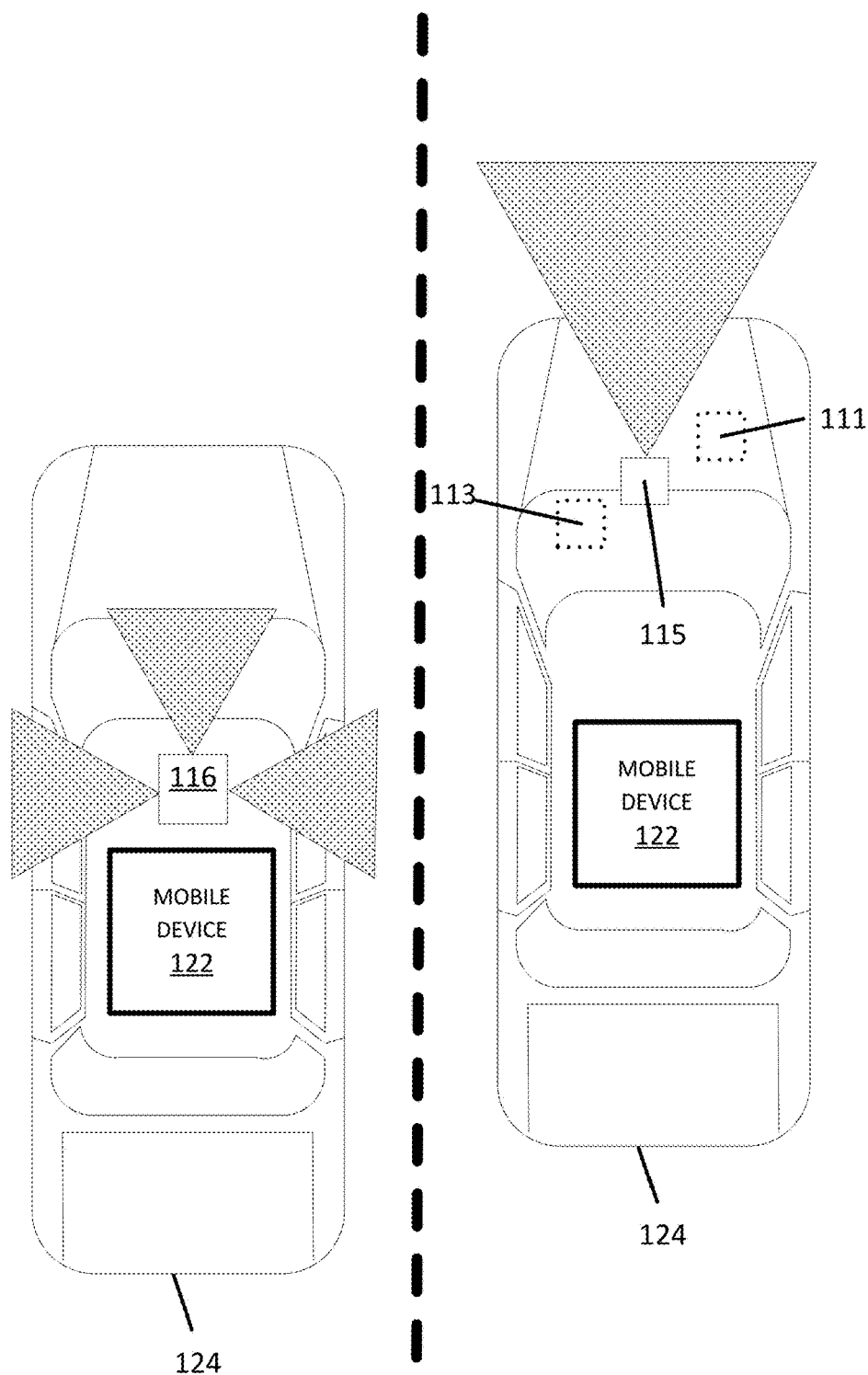
FIG. 8 illustrates exemplary vehicles of the systems of FIG. 1.

FIG. 8 illustrates an exemplary vehicle 124 of the system of FIG. 1. The vehicles 124 may include a variety of devices such as a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the output of the neural network or other model and other geographic data received from geographic database 123 and the server 125 to generate driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the output of the neural network or other model and/or other geographic data received from geographic database 123 and the server 125 to generate driving commands or navigation commands. For example, the may provide a driving command to the vehicle 124 based on the output of the neural network or other model.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to the output of the neural network or other model and other geographic data received from geographic database 123 and the server 125 to generate driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the output of the neural network or other model and other geographic data received from geographic database 123 and the server 125 to generate driving commands or navigation commands.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments, which may be determined based on the output of the neural network or other model and other factors.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 9:
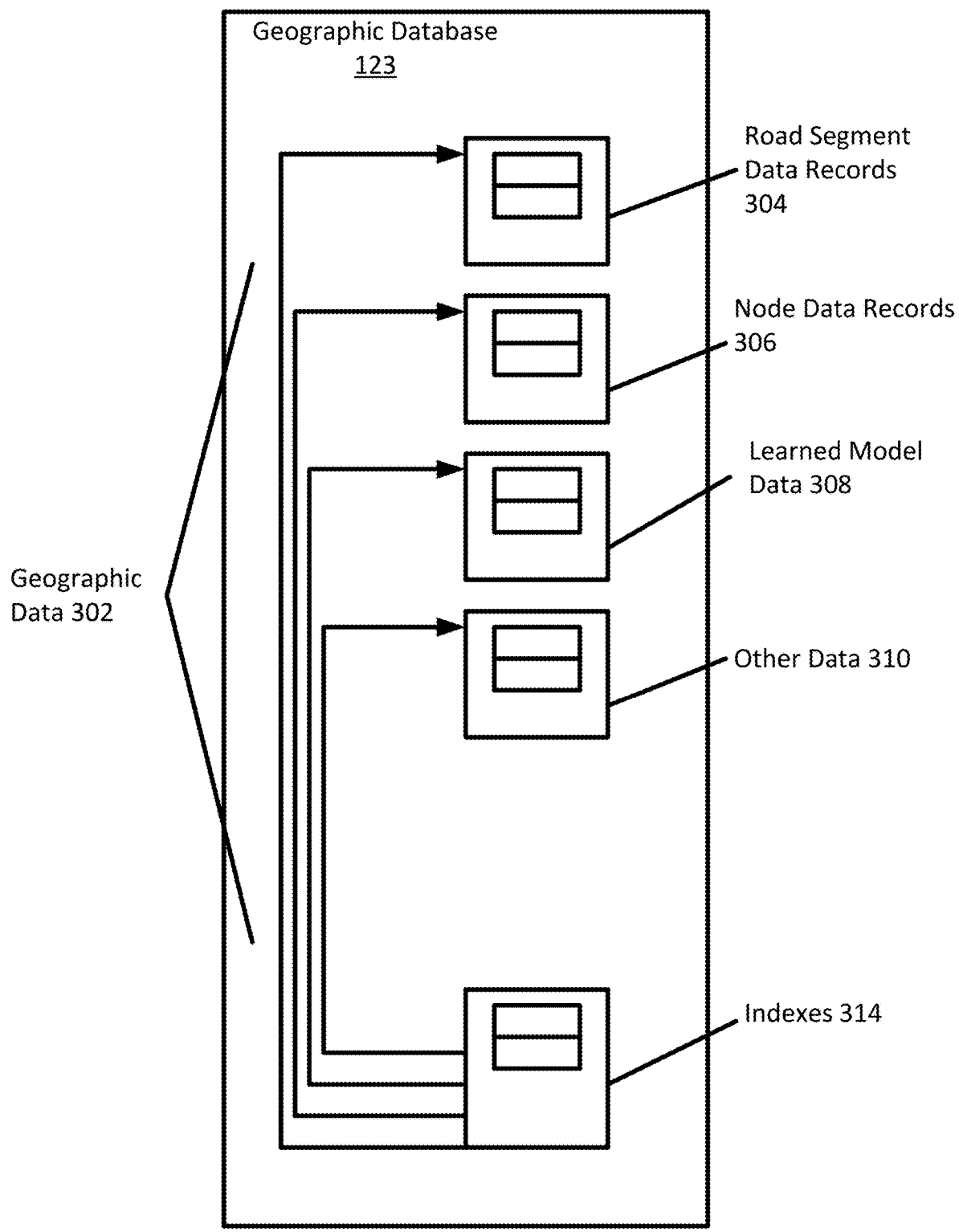
FIGS. 9 and 10 illustrate example geographic databases.

In FIG. 9 the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may include mapping information generated by the learned model as learned model data 308, which may be associated with a road segment in the segment data records 304 or a geographic coordinate.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

Figure 10:
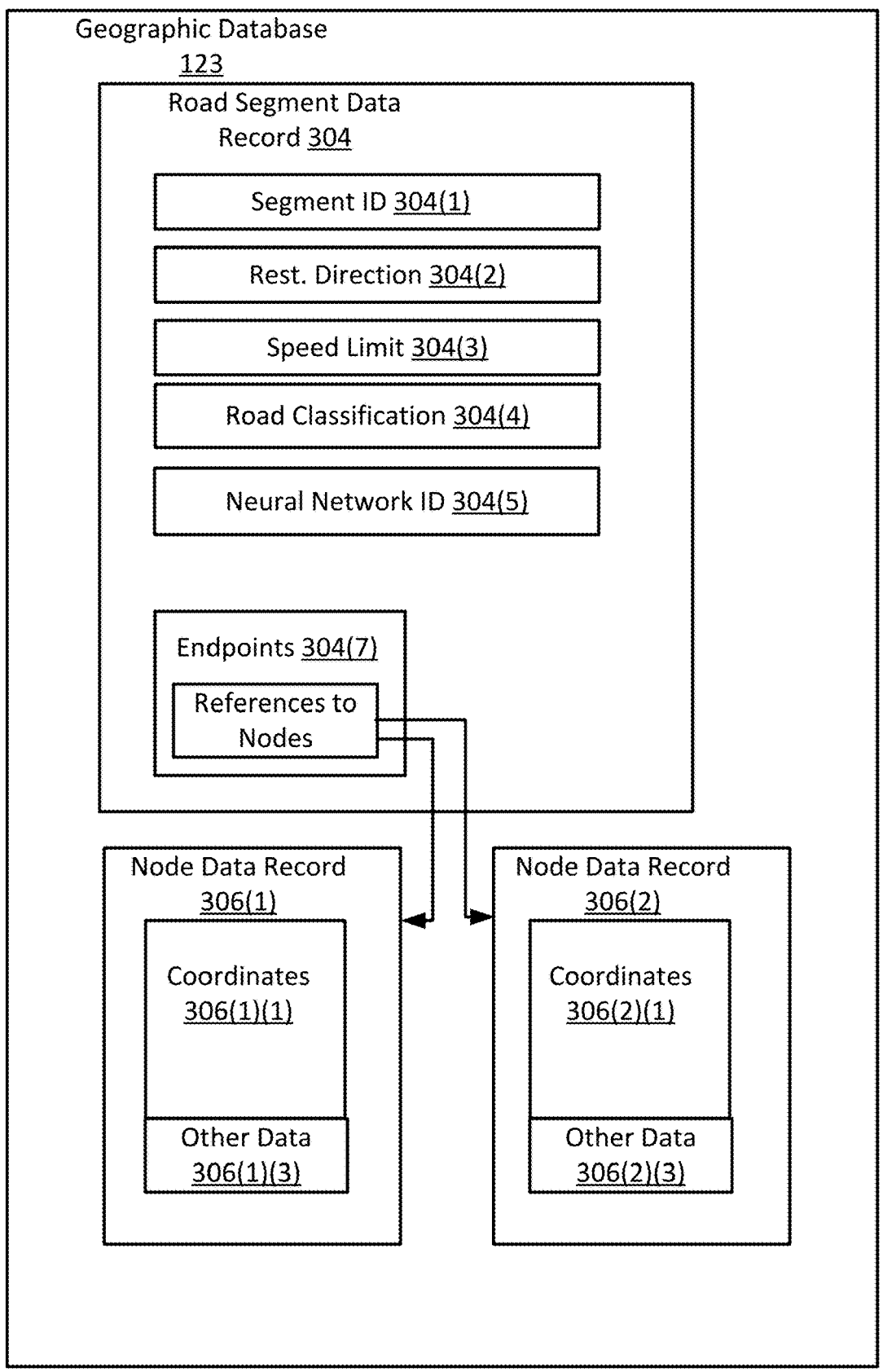

FIG. 10 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe a neural network identifier 304(5) that indicates the neural network that should be used for data collected on the road segment or type of road segment for the road segment data record 304.

Additional schema may be used to describe road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 10 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, the node data records 306(1) and 306(2) may also include other data 306(1)(3) and 306(2)(3) that refer to various other attributes of the nodes. In one example, the node data records 306(1) and 306(2) include the latitude and longitude coordinates 306(1)(1) and 306(2)(1) derived from the learned model and the other data 306(1)(3) and 306(2)(3) reference an identifier for the learned model, the aerial images analyzed to determined the node data records, and/or the control points used to modify the aerial images and/or train the learned model.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:
1. A method for creating or updating a map database, the method further comprising:
receiving at least a first aerial image for a training geographic area;
receiving terrestrial sensor data collected at a terrestrial vehicle;
identifying at least one control point of at least one object detected in the terrestrial sensor data;
correlating points of the at least one object represented in at least the first aerial image with the at least one control point of the at least one object detected in the terrestrial sensor data;
orthorectifying the at least one object represented in at least the first aerial image using the correlated points;
training a neural network using the at least one control point from the terrestrial sensor data collected at the terrestrial vehicle and the orthorectified at least one object represented in at least the first aerial image;
wherein the training of the neural network includes performing iterative operations of the neural network based on data from a low altitude aerial vehicle and a high altitude aerial vehicle;
receiving additional aerial images as input to the trained neural network and identifying additional objects in the additional aerial images using the trained neural network; and
updating map information in a map database to include the identified additional objects;
wherein the identified additional object in the map information is at least one of a sign, a pole, a lane line, a road boundary or a barrier.

2. The method of claim 1, wherein the at least first aerial image includes a plurality of images for the training geographic area and the neural network is defined based on the plurality of images.

3. The method of claim 1, wherein orthorectifying the at least one object further comprises:
identifying a characteristic of an aerial vehicle; and
calculating at least one resultant image feature that reduces distortion from the characteristic of the aerial vehicle.

4. The method of claim 1, wherein the map information includes a navigation object and corresponding location.

5. The method of claim 1, wherein the neural network includes a semantic segmentation model or a polyline model.

6. The method of claim 5, wherein the semantic segmentation model outputs pixel values for the map information.

7. The method of claim 5, wherein the polyline model outputs coordinates for at least one polyline for the map information.

8. The method of claim 1, further comprising:
limiting the training geographic area using at least one control point from the terrestrial sensor data as ground truth.

9. The method of claim 1, further comprising: generating a navigation instruction from the map information of the map database.

10. The method of claim 1, further comprising: generating a driving command from the map information of the map database.

11. The method of claim 1, further comprising:
generating a model including the map information of the map database.

12. The method of claim 1, further comprising:
receiving at least an additional image for the training geographic area;
orthorectifying at least the additional image using the at least one control point from the terrestrial sensor data, wherein the orthorectifying is repeated until images for the training geographic area are orthorectified.

13. A non-transitory computer readable medium including instructions that when performed by a processor are configured to:
receive at least a first aerial image for a training geographic area;
receive terrestrial sensor data collected at a terrestrial vehicle;
identify at least one control point of at least one object detected in the terrestrial sensor data;
correlate points of the at least one object represented in at least the first aerial image with the at least one control point of the at least one object detected in the terrestrial sensor data;
orthorectify the at least one object represented in at least the first aerial image using the correlated points;
train a neural network using: at least one control point from the terrestrial sensor data collected at the terrestrial vehicle and the orthorectified at least one object represented in the at least the first aerial image;
wherein the training of the neural network includes performing iterative operations of the neural network based on data from a low altitude aerial vehicle and a high altitude aerial vehicle;
receive additional aerial images as input to the trained neural network and identifying additional objects in the additional aerial images using the trained neural network; and
update map information in a map database to include the identified additional objects;
wherein the identified additional object in the map information is at least one of a sign, a pole, a lane line, a road boundary or a barrier.

14. The computer readable medium of claim 13, wherein orthorectifying the at least one object further comprises:
identifying a characteristic of an aerial vehicle; and
calculating at least one resultant image feature that reduces distortion from the characteristic of the aerial vehicle.

15. The computer readable medium of claim 13, wherein the neural network includes a semantic segmentation model configured to output pixel values for the map information or a polyline model configured to output coordinates for at least one polyline for the map information.

16. A method for creating or updating a map database, the method further comprising:
receiving at least a first aerial image for a training geographic area;
receiving terrestrial sensor data collected at a terrestrial vehicle;
identifying at least one control point of at least one object detected in the terrestrial sensor data;
correlating points of the at least one object represented in at least the first aerial image with the at least one control point of the at least one object detected in the terrestrial sensor data;
orthorectifying the at least one object represented in at least the first aerial image using the correlated points;
training a neural network using: at least one control point from the terrestrial sensor data collected at a terrestrial vehicle and the orthorectified at least one object represented in at least the first aerial image,
wherein the training of the neural network includes performing iterative operations of the neural network based on data from a low altitude aerial vehicle and a high altitude aerial vehicle;
receiving additional aerial images as input to the trained neural network and identifying additional objects in the additional aerial images using the trained neural network;
updating map information in a map database to include road attributes associated with the identified additional objects.

* * * * *